United States Patent [19]

Nohara

[11] 4,109,037
[45] Aug. 22, 1978

[54] LAMINATED PACKING MATERIALS
[75] Inventor: Shigezo Nohara, Yokohama, Japan
[73] Assignee: Toyo Seikan Kaisha, Ltd., Japan
[21] Appl. No.: 641,584
[22] Filed: Dec. 17, 1975

Related U.S. Application Data
[63] Continuation-in-part of Ser. No. 463,173, Apr. 22, 1974, abandoned.

[30] Foreign Application Priority Data

Apr. 30, 1973 [JP] Japan .................................. 48-47753

[51] Int. Cl.² .......................... B65D 1/00; B32B 27/08
[52] U.S. Cl. ..................................... 428/35; 428/517; 428/518; 428/519; 428/520; 428/522; 264/209; 264/176 R
[58] Field of Search ................. 428/35, 518, 517, 520, 428/519, 522; 264/209, 176 R

[56] References Cited

U.S. PATENT DOCUMENTS

| | | | |
|---|---|---|---|
| 3,414,456 | 12/1968 | Roberts | 428/35 |
| 3,767,523 | 10/1973 | Schwarz | 428/520 X |
| 3,932,693 | 1/1976 | Shaw et al. | 428/518 |
| 3,993,810 | 11/1976 | Bonis | 428/35 |
| 4,015,033 | 3/1977 | Nield | 428/520 X |

Primary Examiner—P. C. Ives
Attorney, Agent, or Firm—Wenderoth, Lind & Ponack

[57] ABSTRACT

In a laminated packing material comprising a plurality of layers of plastics which are laminated while hot, one layer is made of an acrylonitrile-rich resinous material and the other layer is made of a polyolefin or an ethylene-vinyl acetate copolymer, at least one of the layers preferably containing an ionomer or an ethylene-vinyl acetate copolymer.

7 Claims, 1 Drawing Figure

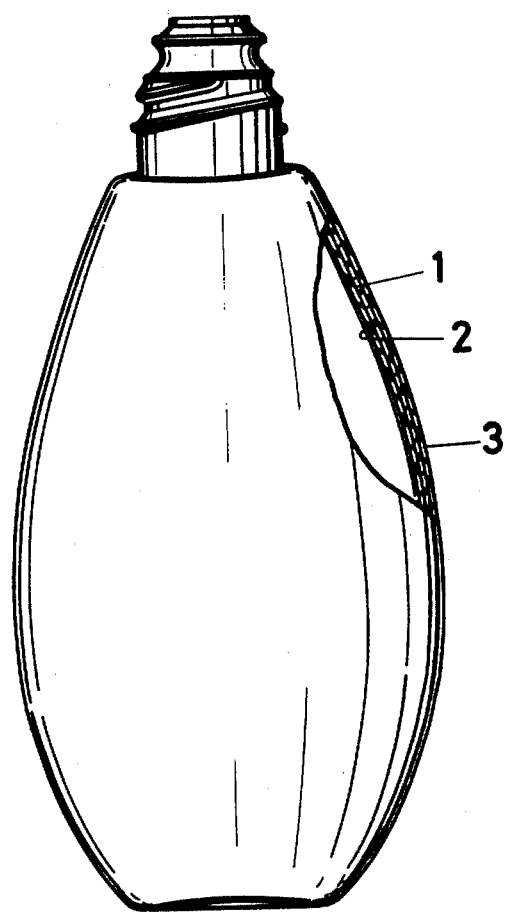

LAMINATED PACKING MATERIALS

This application is a continuation-in-part of Ser. No. 463,173, filed Apr. 22, 1974, now abandoned.

BACKGROUND OF THE INVENTION

This invention relates to improvements in laminated packing materials in the form of a hollow molded article, film or sheet, and more particularly to a laminated packing material wherein one layer of the lamination consists essentially of an acrylonitrile-rich resinous material or comprises an acrylonitrile-rich resinous material, and the other layer consists essentially of a polyolefin or an ethylene-vinyl acetate copolymer, or contains a resinous material comprising a polyolefin or an ethylene-vinyl acetate copolymer.

Although a polyolefin and an ethylene-vinyl acetate copolymer, especially those containing a small quantity of vinyl acetate, have excellent water and moisture proof properties, due to their high permeability to gas such as oxygen, they are not suitable for use as packing materials for foodstuffs, medicines and cosmetics, which are required to have high resistance to gas permeance.

SUMMARY OF THE INVENTION

It is an object of this invention to provide an improved laminated packing material having high resistance to gas permeance.

Another object of this invention is to provide an improved laminated packing material having improved mechanical strength wherein the layers of such material are firmly bonded together without using any bonding agent therebetween.

Still another object of this invention is to provide an improved laminated packing material that can be manufactured with a minimum number of extruders and with a laminating die of simple construction.

According to this invention, these and other objects can be accomplished by providing a packing material made from a lamination of a plurality of plastic layers which are bonded together while hot, characterized in that one layer is made of an acrylonitrile-rich resinous material, i.e. containing more than 50 mole % of acrylonitrile, and the other layer is made of a polyolefin or an ethylene-vinyl acetate copolymer.

According to a modification of this invention at least one layer contains, as additive, an ionomer, or an ethylene-vinyl acetate copolymer having more than 5 mole % of vinyl acetate units, in an amount of 2 to 30 parts by weight based on 100 parts of the plastic material comprising said one layer, for the purpose of improving the mechanical strength and the water and moisture resistant properties of the lamination.

To manufacture the packing material of this invention, two or more extruders are used to extrude two or more thermoplastic resins. Extruded sheets are laminated while hot in a laminating die at the extrusion ends of the extruders, thus causing the sheets to fuse together. To manufacture hollow articles, laminated multilayer parisons are blow-molded into final articles. To manufacture the flat packing sheets, the laminated sheets are cooled to solidify. Thus, the laminated sheets are formed into an integral structure while they are hot. These laminated sheets are different from ordinary laminations which are prepared by laminating independently manufactured cold sheets.

In this manner, the laminated packing material of this invention can be prepared without using any bonding agent or a layer of bonding agent between the layers of different materials, but the layers can be readily fused together by suitably selecting the materials.

The invention is further characterized in that a suitable polymer is incorporated into the materials for one or two layers for improving the bonding between the layers.

The compositions of the respective layers of the novel laminated packing material of this invention will now be described. One layer contains an acrylonitrile-rich resinous material (such as those sold under the trade name Barex) characterized by its high resistance to gas permeance (for example, low oxygen permeability). However, such acrylonitrile-rich resinous material has a relatively high water permeability and is relatively brittle. In accordance with this invention, these defects are compensated for by the layer of a polyolefin, or an ethylene-vinyl acetate copolymer containing not greater than 8 mole percent of vinyl acetate units. Especially, as an ethylene-vinyl acetate copolymer has an excellent bonding property, the layer thereof can be readily heat-bonded to the film of the acrylonitrile-rich resinous material. The acrylonitrile-rich resinous materials utilized in this invention may be made from polyacrylonitriles, or from acrylonitrile, an acrylic ester and butadiene. Polyethylene and polypropylene etc. can be used as the polyolefin.

For the purpose of improving the bonding of the layers, in accordance with this invention, 2 to 30 parts by weight of an ionomer, for example Surlyn A (Trade Mark) or an ethylene-vinyl acetate copolymer is incorporated into 100 parts of the acrylonitrile-rich resinous composition comprising one of the layers. Although where a larger part of ionomer or ethylene-vinyl acetate copolymer is incorporated into this layer, the bonding force between the layers can be improved, the advantage of using the acrylonitrile-rich resinous material for the purpose of improving the resistance to gas permeance will be decreased.

Where the other layer consists of a polyolefin, from 2 to 15 parts by weight of said ionomer of ethylene-vinyl acetate copolymer is incorporated into 100 parts of the polyolefin, and where the other layer consists of an ethylene-vinyl acetate copolymer, from 2 to 15 parts by weight of said ionomer is incorporated into 100 parts of the ethylene-vinyl acetate copolymer for the purpose of improving the bonding strength between the layers. Where the ionomer is used in excess of said specified quantity, while the bonding strength can be improved, the resistance to water and moisture of the lamination decreases. On the other hand, when the quantity of the additives incorporated into the respective layers is less than 2 parts, the desired effect cannot be attained.

When the lamination comprises three layers, the intermediate layer may consist of an acrylonitrile-rich resinous material and the two outer layers may consist of a polyolefin, or an ethylene-vinyl acetate copolymer. Although it is not always necessary to make two outer layers of the same resinous material, if the two outer layers consist of the same material it is possible to produce a three-layer lamination having a sandwich construction by using two extruders, one for extruding the intermediate layer and the other for extruding the two outer layers. This arrangement not only decreases the number of the extruders but also simplifies the construction of the laminating die. By sandwiching the intermediate layer of the acrylonitrile-rich resinous material between two outer layers of polyolefin or ethylene-vinyl acetate copolymer, it is possible to compensate for the gas permeability and the humidity-dependency of the intermediate layer, by the outer layers, thus improving the resistance of the laminated packing material against water and moisture. Furthermore, the deficiency in mechanical strength, that is the brittleness of the lamination, which arises when the acrylonitrile-rich resinous material is used to form the inner or outer layers, can be eliminated by forming the intermediate layer with the acrylonitrile-rich resinous material, and the outer or inner layers with polyolefin or ethylene-vinyl acetate copolymer.

The term "ionomer" utilized herein means a polymer in which organic and inorganic components are bonded together by a covalent bond and an ionic bond, such ionomer being available on the market under the Trade Mark Surlyn A, for example Surlyn A 1652 which has a melt index of 6.0, a density of 0.936 and a melting point of 99° C. Such ionomer can be prepared by adding a metal hydroxide, a lower alcoholate or a metal salt of a lower aliphatic acid (the metal portion of the hydroxide, lower alcoholate or salt of a lower aliphatic acid being sodium, potassium, magnesium or zinc) to an ethylene type polymer copolymerized with a small quantity of a monomer (for example, acrylic or methacrylic acid) containing a carboxyl group in its side chain. The metal hydroxide neutralizes the major portion of the acid groups. Thus, the carboxyl anions distributed along the chain of the molecule electrostatically bond with the metal cations present between the molecules to form a type of bridge.

More particularly, the ionomer utilized in this invention is a metal ion-containing polymer of a major proportion of an olefin monomer and a minor proportion of an ethylencially unsaturated monomer containing a carboxyl radical, and such a polymer containing metal ions is characterized in that a portion of the carboxyl radical is neutralized by metal ions, such as sodium ions.

For example, a copolymer of a major proportion of ethylene, a minor proportion of acrylic acid and acrylic acid neutralized by sodium ions, or a copolymer of a major proportion of ethylene, a minor proportion of methacrylic acid and methacrylic acid neutralized by sodium ions is used.

The olefin monomer and unsaturated acid monomer are copolymerized by the action of an ordinary free radical catalyst. A composition consisting of about 96 mole percent of olefin and 4 percent of acid monomer is preferred.

If desired, pigments or other additives may be incorporated into the polyolefin or ethylene-vinyl acetate copolymer utilized in this invention.

BRIEF DESCRIPTION OF THE DRAWING

In the accompanying drawing, the single figure shows a side view, partly in section, of a hollow article embodying the invention.

DESCRIPTION OF THE PREFERRED EMBODIMENTS

Referring now to the accompanying drawing, there is shown a hollow article made of a lamination embodying the invention. The lamination comprises a sandwich construction of an intermediate layer 1, and inner and outer layers 2 and 3 of the same material, the layers being extruded simultaneously and bonded together while hot.

EXAMPLE 1

The intermediate layer 1 was made of an acrylonitrile-rich resinous material sold under the Trade Mark Barex 210 (produced by graft copolymerization of 73-77 parts by weight of acrylonitrile and 23-27 parts by weight of methyl acrylate in the presence of 8-10 parts by weight of a butadiene-acrylonitrile copolymer containing approximately 70% by weight of polymer units derived from butadiene) whereas the inner and outer layers 2 and 3 were made of an ethylene-vinyl acetate copolymer containing 8 mole % of vinyl acetate. Parisons were formed on a lamination of the layers 1, 2 and 3 which were extruded simultaneously by two extruders and bonded together while hot in a manner described above. The parisons were blow-molded into hollow articles like incandescent lamps by means of a conventional blow-molding machine. The resulting hollow article had a weight of 28g, and an inner volume of approximately 450cc. The minimum wall thickness of the outer layer was 0.28mm, that of the intermediate layer was 0.07mm and that of the inner layer was 0.32mm. The oxygen permeability of the hollow container was 38 cc/m$^2$/day under the conditions of one atmosphere of pressure, a temperature of 37° C, and an inside relative humidity of 20%. The average bonding strength between the layers was 0.3kg/2cm. The hollow article was filled with brine at a temperature of from −2° C to 0° C and the filled article was dropped under gravity 10 times on a concrete floor from a height of 120cm. After dropping 10 times, no crack or peeling off of the layers was noted.

EXAMPLE 2

The intermediate layer was made of a mixture of 100 parts of an acrylonitrile-rich resinous material (Barex 210) and 10 parts of Surlyn A 1652, whereas the inner and outer layers were made of a low density polyethylene sold under the trade name Sumikasen and having a melt index of 0.5. The hollow article prepared in the same manner as Example 1 had a weight of about 27g, and an inner volume of about 450cc. The minimum wall thickness of the outer layer was 0.25mm, that of the intermediate layer was 0.08mm and that of the inner layer was 0.36mm. The oxygen permeability of this hollow article was 32 cc/m$^2$/day under the same conditions as in Example 1, which is comparable to the oxygen permeability of 38 cc/m$^2$/day of a PVC hollow article having an inner volume of 500cc. The average bonding strength between the layers was 0.45 kg/2cm and no crack or peeling off of the layers was noted after the same dropping test as in Example 1.

Thus, the invention provides a laminated packing material in which two or more layers are bonded together while hot, without using any bonding agent between the layers. The packing material has high resistances to water, moisture and gas permeance, so that it is suitable for packing and preserving foodstuffs or the like over a long period of time.

When an ionomer or an ethylene-vinyl acetate copolymer as described above is incorporated into one or more of the layers, not only the bonding strength between the layers can be improved, but also the mechanical strength of the lamination can be improved. Furthermore, as a plurality of layers are simultaneously extruded and bonded together while hot, it is possible not only to decrease the number of extruders, but also to simplify the laminating die.

I claim:

1. A laminated packing material which comprises at least one layer A containing resinous material A and at least one layer B containing resinous material B, said layers A and B having been extruded simultaneously and heat-bonded together so that at least one layer A is in direct contact with at least one layer B, said resinous material A containing more than 50 mole % of acrylonitrile units, said resinous material B being a member selected from the group consisting of polyethylene, polypropylene and an ethylene-vinyl acetate copolymer containing not greater than 8 mole % of vinyl acetate units, at least one of any of said layers A and B further containing an additive selected from the group consisting of (1) ethylene-vinyl acetate copolymers containing more than 5 mole % of vinyl acetate units and (2) ionomers prepared by adding a metal hydroxide, metal lower alcoholate or metal salt of a lower aliphatic acid to a copolymer of a major proportion of ethylene and minor proportion of acrylic acid or methacrylic acid, with the provisos that (1) when said additive is contained in said layer A, then there are from 2 to 30 parts by weight of said additive in said layer A based on 100 parts of said resinous material A, (2) when said additive is contained in said layer B and said resinous material B is polyethylene or polypropylene, then there are from 2 to 15 parts by weight of said additive in said layer B based on 100 parts of said resinous material B, and (3) when said additive is contained in said layer B and said resinous material B is an ethylene-vinyl acetate copolymer containing not greater than 8 mole % of vinyl acetate units, then said additive is said ionomer and there are from 2 to 15 parts by weight of said additive in said layer B based on 100 parts by weight of said resinous material B.

2. The laminated packing material according to claim 1, wherein the resinous material A is prepared from (1) polyacrylonitrile or (2) acrylonitrile, an acrylic ester and butadiene.

3. The laminated packing material according to claim 1, wherein said layer A contains from 2 to 30 parts by weight, based on 100 parts of said resinous material A, of an additive selected from the group consisting of (1) ethylene-vinyl acetate copolymers containing more than 5 mole % of vinyl acetate units, and (2) ionomers prepared by adding a metal hydroxide, metal lower alcoholate or metal salt of a lower aliphatic acid to a copolymer of a major proportion of ethylene and minor proportion of acrylic acid or methacrylic acid.

4. The laminated packing material according to claim 1, wherein said layer B comprises a blend of an ethylene-vinyl acetate copolymer containing not greater than 8 mole % of vinyl acetate units and from 2 to 15 parts by weight, based on 100 parts of the copolymer, of an ionomer prepared by adding a metal hydroxide, metal lower alcoholate or metal salt of a lower aliphatic acid to a copolymer of a major proportion of ethylene and minor proportion of acrylic acid or methacrylic acid.

5. The laminated packing material according to claim 1, wherein said layer B comprises a blend of polyethylene or polypropylene and from 2 to 15 parts by weight, based on 100 parts of the polyethylene or polypropylene, of an ethylene-vinyl acetate copolymer containing more than 5 mole % of vinyl acetate units.

6. The laminated packing material according to claim 1, wherein said layers A and B are laminated by extruding the respective compositions which are to form the layers simultaneously through a plurality of juxtaposed extruders and bonding the extruded layers together while said layers are hot, without using any bonding agent or layer of bonding agent to form the lamination.

7. A hollow article having a wall formed of the laminated packing material according to claim 1.

* * * * *